(12) United States Patent
Wang et al.

(10) Patent No.: US 9,767,156 B2
(45) Date of Patent: Sep. 19, 2017

(54) FEATURE-BASED CANDIDATE SELECTION

(75) Inventors: Xin-Jing Wang, Beijing (CN);
Matthew Robert Scott, Beijing (CN);
Xi Chen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/701,008

(22) PCT Filed: Aug. 30, 2012

(86) PCT No.: PCT/CN2012/080749
§ 371 (c)(1),
(2), (4) Date: Nov. 29, 2012

(87) PCT Pub. No.: WO2014/032244
PCT Pub. Date: Mar. 6, 2014

(65) Prior Publication Data
US 2015/0161126 A1    Jun. 11, 2015

(51) Int. Cl.
*G06F 7/00* (2006.01)
*G06F 17/30* (2006.01)
*G06F 3/0484* (2013.01)
*G06F 17/27* (2006.01)

(52) U.S. Cl.
CPC ...... *G06F 17/3053* (2013.01); *G06F 3/04842* (2013.01); *G06F 17/276* (2013.01); *G06F 17/30554* (2013.01); *G06F 17/30864* (2013.01); *G06F 17/30991* (2013.01)

(58) Field of Classification Search
CPC ........... G06F 17/30991; G06F 17/3053; G06F 17/276; G06F 17/30864; G06F 3/04842
USPC ........................ 707/728, 748, 759, 767, 769
See application file for complete search history.

(56) References Cited

U.S. PATENT DOCUMENTS

| | | | |
|---|---|---|---|
| 4,559,604 | A | 12/1985 | Ichikawa et al. |
| 5,796,866 | A | 8/1998 | Sakurai et al. |
| 5,873,107 | A | 2/1999 | Borovoy et al. |
| 5,987,415 | A | 11/1999 | Breese et al. |
| 5,995,928 | A | 11/1999 | Nguyen et al. |
| 6,014,638 | A | 1/2000 | Burge et al. |
| 6,076,056 | A | 6/2000 | Huang et al. |
| 6,085,160 | A | 7/2000 | D'hoore et al. |

(Continued)

FOREIGN PATENT DOCUMENTS

| | | |
|---|---|---|
| CN | 1609764 | 4/2005 |
| CN | 1851617 | 10/2006 |

(Continued)

OTHER PUBLICATIONS

Damper, "Self-Learning and Connectionist Approaches to Text-Phoneme Conversion", retrieved on May 26, 2010 at <<ftp://ftp.cogsci.ed.ac.uk/pub/joe/newbull.ps>>, UCL Press, Connectionist Models of Memory and Language, 1995, pp. 117-144.

(Continued)

*Primary Examiner* — Md. I Uddin
(74) *Attorney, Agent, or Firm* — Lee & Hayes, PLLC

(57) ABSTRACT

A candidate for selection or insertion may be based on extracted candidate features and reference features. The candidate features may be scored and ranked while candidates may be removed from consideration based on criteria. The remaining candidates may be presented for selection and/or insertion.

19 Claims, 4 Drawing Sheets

(56) References Cited

U.S. PATENT DOCUMENTS

| | | | |
|---|---|---|---|
| 6,092,044 A | 7/2000 | Baker et al. | |
| 6,236,964 B1 | 5/2001 | Tamura et al. | |
| 6,247,043 B1 | 6/2001 | Bates et al. | |
| 6,363,342 B2 | 3/2002 | Shaw et al. | |
| 6,377,965 B1 | 4/2002 | Hachamovitch et al. | |
| 6,408,266 B1 | 6/2002 | Oon | |
| 6,460,015 B1 | 10/2002 | Hetherington et al. | |
| 6,731,307 B1 | 5/2004 | Strubbe et al. | |
| 6,732,074 B1 | 5/2004 | Kuroda | |
| 6,801,893 B1 | 10/2004 | Backfried et al. | |
| 6,941,267 B2 | 9/2005 | Matsumoto | |
| 6,963,841 B2 | 11/2005 | Handal et al. | |
| 7,069,254 B2 | 6/2006 | Foulger et al. | |
| 7,089,504 B1 | 8/2006 | Froloff | |
| 7,099,876 B1 | 8/2006 | Hetherington et al. | |
| 7,107,204 B1 | 9/2006 | Liu et al. | |
| 7,165,032 B2 | 1/2007 | Bellegarda | |
| 7,194,538 B1 | 3/2007 | Rabe et al. | |
| 7,224,346 B2 | 5/2007 | Sheng | |
| 7,277,029 B2 | 10/2007 | Thiesson et al. | |
| 7,308,439 B2 | 12/2007 | Baird et al. | |
| 7,353,247 B2 | 4/2008 | Hough et al. | |
| 7,360,151 B1 | 4/2008 | Froloff | |
| 7,370,275 B2 | 5/2008 | Haluptzok et al. | |
| 7,389,223 B2 | 6/2008 | Atkin et al. | |
| 7,447,627 B2 | 11/2008 | Jessee et al. | |
| 7,451,152 B2 | 11/2008 | Kraft et al. | |
| 7,490,033 B2 | 2/2009 | Chen et al. | |
| 7,505,954 B2 | 3/2009 | Heidloff et al. | |
| 7,512,904 B2 | 3/2009 | Matthews et al. | |
| 7,555,713 B2 | 6/2009 | Yang | |
| 7,562,082 B2 | 7/2009 | Zhou | |
| 7,565,157 B1 | 7/2009 | Ortega et al. | |
| 7,599,915 B2 | 10/2009 | Hill et al. | |
| 7,676,517 B2 | 3/2010 | Hurst-Hiller et al. | |
| 7,689,412 B2 | 3/2010 | Wu et al. | |
| 7,725,318 B2 | 5/2010 | Gavalda et al. | |
| 7,728,735 B2 | 6/2010 | Aaron et al. | |
| 7,752,034 B2 | 7/2010 | Brockett et al. | |
| 7,844,599 B2 | 11/2010 | Kasperski et al. | |
| 7,881,934 B2 | 2/2011 | Endo et al. | |
| 7,917,355 B2 | 3/2011 | Wu et al. | |
| 7,917,488 B2 | 3/2011 | Niu et al. | |
| 7,930,676 B1 | 4/2011 | Thomas | |
| 7,953,730 B1 | 5/2011 | Bleckner et al. | |
| 7,957,955 B2 | 6/2011 | Christie et al. | |
| 7,957,969 B2 | 6/2011 | Alewine et al. | |
| 7,983,910 B2 | 7/2011 | Subramanian et al. | |
| 8,161,073 B2 | 4/2012 | Connor | |
| 8,230,336 B2 | 7/2012 | Morrill | |
| 8,285,745 B2 * | 10/2012 | Li | G06F 17/30672 707/706 |
| 8,498,864 B1 | 7/2013 | Liang et al. | |
| 8,539,359 B2 | 9/2013 | Rapaport et al. | |
| 8,564,684 B2 | 10/2013 | Bai | |
| 8,597,031 B2 | 12/2013 | Cohen et al. | |
| 8,762,356 B1 | 6/2014 | Kogan | |
| 8,996,356 B1 | 3/2015 | Yang et al. | |
| 2002/0005784 A1 | 1/2002 | Balkin et al. | |
| 2002/0045463 A1 | 4/2002 | Chen et al. | |
| 2002/0188603 A1 | 12/2002 | Baird et al. | |
| 2003/0041147 A1 | 2/2003 | van den Oord et al. | |
| 2003/0160830 A1 | 8/2003 | DeGross | |
| 2003/0179229 A1 | 9/2003 | Van Erlach et al. | |
| 2003/0220917 A1 * | 11/2003 | Copperman | G06F 17/3064 |
| 2004/0128122 A1 | 7/2004 | Privault et al. | |
| 2004/0220925 A1 | 11/2004 | Liu et al. | |
| 2004/0243415 A1 | 12/2004 | Commarford et al. | |
| 2005/0144162 A1 * | 6/2005 | Liang | 707/3 |
| 2005/0203738 A1 | 9/2005 | Hwang | |
| 2005/0216253 A1 | 9/2005 | Brockett | |
| 2006/0026147 A1 | 2/2006 | Cone et al. | |
| 2006/0167857 A1 | 7/2006 | Kraft et al. | |
| 2006/0190822 A1 | 8/2006 | Basson et al. | |
| 2006/0204142 A1 * | 9/2006 | West et al. | 382/305 |
| 2006/0206324 A1 | 9/2006 | Skilling et al. | |
| 2006/0242608 A1 | 10/2006 | Garside et al. | |
| 2006/0248074 A1 | 11/2006 | Carmel et al. | |
| 2007/0016422 A1 | 1/2007 | Mori et al. | |
| 2007/0033269 A1 | 2/2007 | Atkinson et al. | |
| 2007/0050339 A1 | 3/2007 | Kasperski et al. | |
| 2007/0052868 A1 | 3/2007 | Chou et al. | |
| 2007/0088686 A1 | 4/2007 | Hurst-Hiller et al. | |
| 2007/0089125 A1 | 4/2007 | Claassen | |
| 2007/0124132 A1 | 5/2007 | Takeuchi | |
| 2007/0150279 A1 | 6/2007 | Gandhi et al. | |
| 2007/0162281 A1 | 7/2007 | Saitoh et al. | |
| 2007/0167689 A1 | 7/2007 | Ramadas et al. | |
| 2007/0192710 A1 | 8/2007 | Platz et al. | |
| 2007/0208738 A1 | 9/2007 | Morgan | |
| 2007/0213983 A1 | 9/2007 | Ramsey | |
| 2007/0214164 A1 | 9/2007 | MacLennan et al. | |
| 2007/0233692 A1 * | 10/2007 | Lisa et al. | 707/10 |
| 2007/0255567 A1 | 11/2007 | Bangalore et al. | |
| 2008/0046405 A1 | 2/2008 | Olds et al. | |
| 2008/0115046 A1 | 5/2008 | Yamaguchi | |
| 2008/0167858 A1 | 7/2008 | Christie et al. | |
| 2008/0171555 A1 | 7/2008 | Oh et al. | |
| 2008/0189628 A1 | 8/2008 | Liesche et al. | |
| 2008/0195645 A1 | 8/2008 | Lapstun et al. | |
| 2008/0195980 A1 | 8/2008 | Morris | |
| 2008/0208567 A1 | 8/2008 | Brockett et al. | |
| 2008/0221893 A1 | 9/2008 | Kaiser | |
| 2008/0288474 A1 | 11/2008 | Chin et al. | |
| 2008/0294982 A1 | 11/2008 | Leung et al. | |
| 2008/0312910 A1 | 12/2008 | Zhang | |
| 2009/0002178 A1 | 1/2009 | Guday et al. | |
| 2009/0043584 A1 | 2/2009 | Philips | |
| 2009/0043741 A1 | 2/2009 | Kim | |
| 2009/0077464 A1 | 3/2009 | Goldsmith et al. | |
| 2009/0106224 A1 * | 4/2009 | Roulland | G06F 17/30646 |
| 2009/0128567 A1 | 5/2009 | Shuster et al. | |
| 2009/0154795 A1 | 6/2009 | Tan et al. | |
| 2009/0187515 A1 * | 7/2009 | Andrew | G06F 17/3064 706/12 |
| 2009/0187824 A1 | 7/2009 | Hinckley et al. | |
| 2009/0210214 A1 | 8/2009 | Qian et al. | |
| 2009/0216690 A1 | 8/2009 | Badger et al. | |
| 2009/0222437 A1 | 9/2009 | Niu et al. | |
| 2009/0249198 A1 | 10/2009 | Davis et al. | |
| 2009/0313239 A1 | 12/2009 | Wen et al. | |
| 2010/0005086 A1 | 1/2010 | Wang et al. | |
| 2010/0122155 A1 | 5/2010 | Monsarrat | |
| 2010/0125811 A1 | 5/2010 | Moore et al. | |
| 2010/0138210 A1 | 6/2010 | Seo et al. | |
| 2010/0146407 A1 | 6/2010 | Bokor et al. | |
| 2010/0169770 A1 | 7/2010 | Hong et al. | |
| 2010/0180199 A1 | 7/2010 | Wu et al. | |
| 2010/0217581 A1 | 8/2010 | Hong | |
| 2010/0217795 A1 | 8/2010 | Hong | |
| 2010/0231523 A1 | 9/2010 | Chou | |
| 2010/0245251 A1 | 9/2010 | Yuan et al. | |
| 2010/0251304 A1 | 9/2010 | Donoghue et al. | |
| 2010/0306139 A1 | 12/2010 | Wu et al. | |
| 2010/0306248 A1 | 12/2010 | Bao et al. | |
| 2010/0309137 A1 | 12/2010 | Lee | |
| 2011/0014952 A1 | 1/2011 | Minton | |
| 2011/0041077 A1 | 2/2011 | Reiner | |
| 2011/0060761 A1 | 3/2011 | Fouts | |
| 2011/0066431 A1 | 3/2011 | Ju et al. | |
| 2011/0087483 A1 | 4/2011 | Hsieh et al. | |
| 2011/0107265 A1 | 5/2011 | Buchanan et al. | |
| 2011/0131642 A1 | 6/2011 | Hamura et al. | |
| 2011/0137635 A1 | 6/2011 | Chalabi et al. | |
| 2011/0161080 A1 | 6/2011 | Ballinger et al. | |
| 2011/0161311 A1 | 6/2011 | Mishne et al. | |
| 2011/0173172 A1 | 7/2011 | Hong et al. | |
| 2011/0178981 A1 | 7/2011 | Bowen et al. | |
| 2011/0184723 A1 | 7/2011 | Huang et al. | |
| 2011/0188756 A1 | 8/2011 | Lee et al. | |
| 2011/0191321 A1 | 8/2011 | Gade et al. | |
| 2011/0201387 A1 | 8/2011 | Paek et al. | |
| 2011/0202836 A1 | 8/2011 | Badger et al. | |
| 2011/0202876 A1 | 8/2011 | Badger et al. | |

(56) References Cited

U.S. PATENT DOCUMENTS

| | | | |
|---|---|---|---|
| 2011/0219299 | A1 | 9/2011 | Scalosub |
| 2011/0258535 | A1 | 10/2011 | Adler, III et al. |
| 2011/0282903 | A1 | 11/2011 | Zhang |
| 2011/0289105 | A1 | 11/2011 | Hershowitz |
| 2011/0296324 | A1 | 12/2011 | Goossens et al. |
| 2012/0016678 | A1 | 1/2012 | Gruber et al. |
| 2012/0019446 | A1 | 1/2012 | Wu et al. |
| 2012/0022853 | A1 | 1/2012 | Ballinger et al. |
| 2012/0023103 | A1* | 1/2012 | Soderberg et al. ........... 707/739 |
| 2012/0029902 | A1 | 2/2012 | Lu et al. |
| 2012/0035932 | A1 | 2/2012 | Jitkoff et al. |
| 2012/0036468 | A1 | 2/2012 | Colley |
| 2012/0041752 | A1 | 2/2012 | Wang et al. |
| 2012/0060113 | A1 | 3/2012 | Sejnoha et al. |
| 2012/0060147 | A1 | 3/2012 | Hong et al. |
| 2012/0078611 | A1 | 3/2012 | Soltani et al. |
| 2012/0113011 | A1 | 5/2012 | Wu et al. |
| 2012/0117506 | A1 | 5/2012 | Koch et al. |
| 2012/0143897 | A1 | 6/2012 | Wei et al. |
| 2012/0173222 | A1 | 7/2012 | Wang et al. |
| 2012/0222056 | A1 | 8/2012 | Donoghue et al. |
| 2012/0297294 | A1 | 11/2012 | Scott et al. |
| 2012/0297332 | A1 | 11/2012 | Changuion et al. |
| 2013/0016113 | A1 | 1/2013 | Adhikari et al. |
| 2013/0054617 | A1 | 2/2013 | Colman |
| 2013/0091409 | A1 | 4/2013 | Jeffery |
| 2013/0132359 | A1 | 5/2013 | Lee et al. |
| 2013/0159920 | A1 | 6/2013 | Scott et al. |
| 2013/0298030 | A1 | 11/2013 | Nahumi et al. |
| 2013/0346872 | A1 | 12/2013 | Scott et al. |
| 2014/0040238 | A1 | 2/2014 | Scott et al. |
| 2015/0106702 | A1 | 4/2015 | Scott et al. |
| 2015/0121291 | A1 | 4/2015 | Scott et al. |
| 2015/0370833 | A1* | 12/2015 | Fey .................. G06F 17/30277 707/767 |
| 2016/0196150 | A1 | 7/2016 | Jing et al. |

FOREIGN PATENT DOCUMENTS

| | | |
|---|---|---|
| CN | 1908863 A | 2/2007 |
| CN | 101183355 A | 5/2008 |
| CN | 101276245 | 10/2008 |
| CN | 101286092 | 10/2008 |
| CN | 101286093 | 10/2008 |
| CN | 101286094 A | 10/2008 |
| CN | 101587471 A | 11/2009 |
| CN | 101661474 A | 3/2010 |
| CN | 102012748 A | 4/2011 |
| CN | 102056335 | 5/2011 |
| CN | 102144228 | 8/2011 |
| CN | 102193643 A | 9/2011 |
| CN | 102314441 A | 1/2012 |
| CN | 102314461 A | 1/2012 |
| JP | 2000148748 | 5/2000 |
| JP | 2011507099 | 3/2011 |
| JP | 2012008874 | 1/2012 |
| JP | 2012094156 | 5/2012 |
| WO | WO2010105440 | 9/2010 |

OTHER PUBLICATIONS

"Database", Microsoft Computer Dictionary, Fifth Edition, retrieved on May 13, 2011, at <<http://academic.safaribooksonline.com/book/communications/0735614954>>, Microsoft Press, May 1, 2002, 2 pages.

"File", Microsoft Computer Dictionary, Fifth Edition, retrieved on May 13, 2011, at <<http://academic.safaribooksonline.com/book/communications/0735614954>>, Microsoft Press, May 1, 2002, 2 pages.

Kumar, "Google launched Input Method editor—type anywhere in your language", retrieved at <<http://shoutingwords.com/google-launched-input-method-editor.html>>, Mar. 2010, 12 pages.

Office action for U.S. Appl. No. 12/693,316, mailed on Oct. 30, 2013, Huang, et al., "Phonetic Suggestion Engine", 24 pages.

Office action for U.S. Appl. No. 12/693,316, mailed on Jun. 19, 2013, Huang et al., "Phonetic Suggestion Engine", 20 pages.

"Search Engine", Microsoft Computer Dictionary, Mar. 2002, Fifth Edition, pp. 589.

Wikipedia, "Selection Based Search", retrieved Mar. 23, 2012 at http://en.wikipedia.org/wiki/Selection based search, 3 pgs.

Wikipedia, "Soundex", retrieved on Jan. 20, 2010 at http://en.wikipedia.org/wiki/soundex, 3 pgs.

Office action for U.S. Appl. No. 12/693,316, mailed on Oct. 16, 2014, Huang, et al., "Phonetic Suggestion Engine", 24 pages.

Office Action for U.S. Appl. No. 13/315,047, mailed on Oct. 2, 2014, Weipeng Liu, "Sentiment Aware User Interface Customization", 12 pages.

Millward, Steven, "Baidu Japan Acquires Simeji Mobile App Team, for added Japanese Typing fun," Published Dec. 13, 2011, 3 pages.

Final Office Action for U.S. Appl. No. 13/109,021, mailed on Jan. 11, 2013, Scott et al., "Network Search for Writing Assistance", 16 pages.

Lenssen, Philipp, "Google Releases Pinyin Converter," Published Apr. 4, 2007, retrieved at <<http://blogoscoped.com/archive/2007-04-04-n49.html>>, 3 pages.

Office action for U.S. Appl. No. 13/567,305, mailed on Jan. 30, 2014, Scott, et al., "Business Intelligent in-Document Suggestions", 14 pages.

Office action for U.S. Appl. No. 13/315,047, mailed on Feb. 12, 2014, Liu, et al., "Sentiment Aware User Interface Customization", 14 pages.

Office Action for U.S. Appl. No. 13/109,021, mailed on Aug. 21, 2012, Scott et al., "Network Search for Writing Assistance", 19 pages.

Office Action for U.S. Appl. No. 13/109,021, mailed on Sep. 25, 2013, Scott et al., "Network Search for Writing Assistance", 18 pages.

International Search Report & Written Opinion for PCT Patent Application No. PCT/US2013/053321, Mailed Date: Oct. 1, 2013, Filed Date: Aug. 2, 2013, 9 Pages.

Office Action for U.S. Appl. No. 13/109,021, mailed on Mar. 11, 2014, Dyer, A.R., "Network Search for Writing Assistance," 18 pages.

Office Action for U.S. Appl. No. 13/109,021, mailed on Jun. 19, 2014, Dyer, A.R., "Network Search for Writing Assistance," 42 pages.

Office action for U.S. Appl. No. 13/586,267, mailed on Jul. 31, 2014, Scott et al., "Input Method Editor Application Platform", 20 pages.

Non-Final Office Action for U.S. Appl. No. 13/331,023, mailed Aug. 4, 2014, Matthew Robert Scott et al., "Scenario-Adaptive Input Method Editor", 20 pages.

U.S. Appl. No. 12/960,258, filed Dec. 3, 2010, Wei et al., "Wild Card Auto Completion," 74 pages.

U.S. Appl. No. 13/109,021, filed May 17, 2011, Matthew Robert Scott, "Network Search for Writing Assistance," 43 pages.

U.S. Appl. No. 13/331,023, filed Dec. 20, 2011,Tony Hou, Weipeng Liu, Weijiang Xu, and Xi Chen, "Scenario-Adaptive Input Method Editor," 57 pages.

Ciccolini, Ramiro, "Baidu IME More literate in Chinese input," Published Sep. 15, 2011, <<http://www.itnews-blog.com/it/81630.html>> 4 pages.

Millward, "Baidu Japan Acquires Simeji Mobile App Team, for added Japanese Typing fun," Published Dec. 13, 2011, <<http://www.techinasia.com/baidu-japan-simeiji>>, 3 pages.

Ciccolini, "Baidu IME More Literate in Chinese Input," Published Sep. 15, 2011, <<http://www.itnews-blog.com/it/81630.html>>, 4 pages.

Gamon et al., "Using Statistical Techniques and Web Search to Correct ESL Errors," Published 2009, retrieved from <<http://research.microsoft.com/pubs/81312/Calico_published.pdf>>, CALICO Journal, vol. 26, No. 3, 2009, 21 pages.

(56) References Cited

OTHER PUBLICATIONS

"Google launched Input Method editor—type anywhere in your language," published Mar. 2, 2010, retrieved at <<http://shoutingwords.com/google-launched-input-method-editor.html>>, 12 pages.
Lenssen, "Google Releases Pinyin Converter," Published Apr. 4, 2007 <<http://blogoscoped.com/archive/2007-04-04-n49.html>>, 3 pages.
"Google Scribe," retrieved at <<http://www.scribe.googlelabs.com/>>, retrieved date: Feb. 3, 2011, 1 page.
Google Transliteration Input Method (IME) Configuration, published Feb. 5, 2010, retrieved at <<http://www.technicstoday.com/2010/02/google-transliteration-input-method-ime-configuration/>>, pp. 1-13.
Komasu et al., "Corpus-based Predictive Text Input," Proceedings of the Third International Conference on Active Media Technology, May 2005, 6 pages.
Lo et al., "Cross platform CJK input Method Engine," IEEE International Conference on Systems, Man and Cybernetics, Oct. 6, 2002, retrieved at <<http://ieeexplore.ieee.org/stamp/stamp.jsp?tp=&arnumber=1175680>>, pp. 1-6.
"Microsoft Research ESL Assistant," retrieved at <<http://www.eslassistant.com/>>, retrieved date Feb. 3, 2011, 1 page.
Mohan et al., "Input Method Configuration Overview," Jun. 3, 2011, retrieved at <<http://gameware.autodesk.com/documents/gfx_4.0_ime.pdf>>, pp. 1-9.
Scott et al., "Engkoo: Mining theWeb for Language Learning," in Proceedings of the 49th Annual Meeting of the Association for Computational Linguistics: Human Language Technologies: Systems Demonstrations, Jun. 21, 2011, 6 pages.
Sowmya et al., "Transliteration Based Text Input Methods for Telugu," <<http://content.imamu.edu.sa/Scholars/it/VisualBasic/2009_53.pdf>>, Proceedings of 22nd International Conference on Computer Processing of Oriental Languages. Language Technology for the Knowledge-based Economy (ICCPOL), Mar. 2009, pp. 122-132.
Suematsu et al., "Network-Based Context-Aware Input Method Editor," Proceedings: Sixth International Conference on Networking and Services (ICNS), Mar. 7, 2010, retrieved at <<http://ieeexplore.ieee.org/stamp/stamp.jsp?tp=&arnumber=5460679>>, pp. 1-6.
Suzuki et al., "A Comparative Study on Language Model Adaptation Techniques Using New Evaluation Metrics," in Proceedings of Human Language Technology Conference on Empirical Method in Natural Language Processing, Oct. 6, 2005, 8 pages.
Windows XP Chinese Pinyin Setup, published Apr. 15, 2006, retrieved at <<http://www.pinyinjoe.com/pinyin/pinyin_setup.htm>>, pp. 1-10.
Office action for U.S. Appl. No. 13/315,047, mailed on Apr. 24, 2014, Liu et al., "Sentiment Aware User Interface Customization", 13 pages.
Office action for U.S. Appl. No. 12/693,316, mailed on May 19, 2014, Huang et al., "Phonetic Suggestion Engine", 22 pages.
"Prose", Dictionary.com, Jun. 19, 2014, 2 pgs.
Office action for U.S. Appl. No. 13/586,267, mailed on Jan. 2, 2015, Scott et al., "Input Method Editor Application Platform", 19 pages.
Office action for U.S. Appl. No. 13/331,023, mailed on Feb. 12, 2015, Scott et al, "Scenario-Adaptive Input Method Editor", 20 pages.
European Office Action mailed Jun. 18, 2015 for European patent application No. 12879676.0, a counterpart foreign application of U.S. Appl. No. 13/635,306, 5 pages.
Miessler, "7 Essential Firefox Quicksearches", Retrieved from <<https:danielmiessler.com/blog/7-essential-firefox-quicksearches/>>, Published Aug. 19, 2007, 2 pages.
Office action for U.S. Appl. No. 13/331,023, mailed on Jun. 26, 2015, Scott et al., "Scenario-Adaptive Input Method Editor", 23 pages.
Office action for U.S. Appl. No. 13/635,306, mailed on Aug. 14, 2015, Scott et al., "Input Method Editor", 26 pages.

Office Action for U.S. Appl. No. 13/109,021, mailed on Sep. 30, 2014, Dyer, A.R., "Network Search for Writing Assistance," 17 pages.
PCT International Preliminary Report on Patentability mailed Mar. 12, 2015 for PCT Application No. PCT/CN2012/080749, 8 pages.
Supplemenary European Search Report mailed Jul. 16, 2015 for European patent application No. 12880149.5, 5 pages.
Supplemenary European Search Report mailed Sep. 14, 2015 for European patent application No. 12879804.8, 5 pages.
Office action for U.S. Appl. No. 13/315,047, mailed on Sep. 24, 2015, Liu et al., "Sentiment Aware User Interface Customization", 12 pages.
Office action for U.S. Appl. No. 13/635,219, mailed on Sep. 29, 2015, Scott et al., "Cross Lingual Input Method Editor", 14 page.
Supplementary European Search Report mailed Nov. 12, 2015 for European patent application No. 12880149.5, 7 pages.
Guo et al., "NaXi Pictographs Input Method and WEFT", Journal of Computers, vol. 5, No. 1, Jan. 2010, pp. 117-124.
Office action for U.S. Appl. No. 13/586,267 mailed on Nov. 6, 2015, Scott et al., "Input Method Editor Application Platform", 22 pages.
European Office Action mailed Oct. 8, 2015 for European patent application No. 12879804.8, a counterpart foreign application of U.S. Appl. No. 13/586,267, 9 pages.
Ben-Haim, et al., "Improving Web-based Image Search via Content Based Clustering", Proceedings of the 2006 Conference on Computer Vision and Pattern Recognition Workshop (CVPRW '06), IEEE, Jun. 17, 2006, 6 pages.
Berg, et al., "Animals on the Web", Proceedings of the 2006 IEEE Computer Society Conference on Computer Vision and Pattern Recognition (CVPR '06), vol. 2, IEEE, Jun. 17, 2006, pp. 1463-1470.
Partial Supplemenary European Search Report mailed Oct. 26, 2015 for European patent application No. 12883902.4, 7 pages.
Office action for U.S. Appl. No. 13/331,023 mailed on Nov. 20, 2015, Scott et al., "Scenario-Adaptive Input Method Editor", 25 pages.
U.S. Appl. No. 13/635,219, filed Sep. 14, 2011, Scott, et al., "Cross-Lingual Input Method Editor".
Dinamik-Bot, et al., "Input method", retrieved on May 6, 2015 at <<http://en.wikipedia.org/w/index.php?title=Input_method&oldid=496631911>>, Wikipedia, the free encyclopedia, Jun. 8, 2012, 4 pages.
Engkoo Pinyin Redefines Chinese Input, Published on: May 13, 2013, Available at: http://research.microsoft.com/en-us/news/features/engkoopinyinime-051313.aspx.
"English Assistant", Published on: Apr. 19, 2013, Available at: http://bing.msn.cn/pinyin/.
Supplementary European Search Report mailed May 20, 2015 for European Patent Application No. 12879676.0, 3 pages.
"Innovative Chinese Engine", Published on: May 2, 2013, Available at: http://bing.msn.cn/pinyin/help.shtml.
"Input Method (IME)", Retrieved on: Jul. 3, 2013, Available at: http://www.google.co.in/inputtools/cloud/features/input-method.html.
International Search Report & Written Opinion for PCT Patent Application No. PCT/CN2013/081156, mailed May 5, 2014; filed Aug. 9, 2013, 14 pages.
Office action for U.S. Appl. No. 13/635,219, mailed on Mar. 13, 2015, Scott et al., "Cross-Lingual Input Method Editor", 21 pages.
Office action for U.S. Appl. No. 13/635,306, mailed on Mar. 27, 2015, Scott et al., "Input Method Editor", 18 pages.
Office action for U.S. Appl. No. 13/315,047, mailed on Apr. 28, 2015, Liu et al., "Sentiment Aware User Interface Customization", 12 pages.
Office action for U.S. Appl. No. 13/586,267, mailed on May 8, 2015, Scott et al., "Input Method Editor Application Platform", 18 pages.
European Search Report mailed Feburary 18, 2016 for European patent application No. 12883902.4, 7 pages.
European Office Action mailed Mar. 1, 2016 for European Patent Application No. 12883902.4, a counterpart foreign application of U.S. Appl. No. 13/701,008, 8 pages.

(56) References Cited

OTHER PUBLICATIONS

Office action for U.S. Appl. No. 13/635,306, mailed on Feb. 25, 2016, Scott et al., "Input Method Editor", 29 pages.
PCT International Preliminary Report on Patentability mailed Feb. 18, 2016 for PCT Application No. PCT/CN2013/081156, 8 pages.
Translated Chinese Office Action mailed Jun. 3, 2016 for Chinese Patent Application No. 201280074382.1, a counterpart foreign application of U.S. Appl. No. 13/635,219, 18 pages.
Office action for U.S. Appl. No. 13/635,219, mailed on Mar. 24, 2016, Scott et al., "Cross-Lingual Input Method Editor", 29 pages.
Office action for U.S. Appl. No. 13/586,267, mailed on Jun. 7, 2016, Scott et al., "Input Method Editor Application Platform", 24 pages.
Chinese Office Action mailed Jun. 28, 2016 for Chinese Patent Application No. 201280074281.4, a counterpart foreign application of U.S. Appl. No. 13/586,267.
Supplementary European Search Report mailed Jul. 6, 2016 for European patent application No. 13891201.9, 4 pages.
Translated Japanese Office Action mailed May 24, 2016 for Japanese patent application No. 2015-528828, a counterpart foreign application of U.S. Appl. No. 13/701,008, 17 pages.
European Office Action mailed Jul. 19, 2016 for European Patent Application No. 13891201.9, a counterpart foreign application of U.S. Appl. No. 14/911,247, 7 pages.
European Office Action mailed Jul. 19, 2016 for European patent application No. 12880149.5, a counterpart foreign application of U.S. Appl. No. 13/635,219, 7 pages.
Office action for U.S. Appl. No. 13/635,306, mailed on Jul. 28, 2016, Scott et al., "Input Method Editor", 24 pages.
Final Office Action for U.S. Appl. No. 13/635,219, mailed on Aug. 10, 2016, Matthew Robert Scott, "Cross-Lingual Input Method Editor", 29 pages.
Chinese Office Action mailed Jan. 3, 2017 for Chinese patent application No. 201280074383.6, a counterpart foreign application of U.S. Appl. No. 13/635,306.
Chinese Office Action mailed Feb. 3, 2017 for Chinese patent application No. 201280074382.1, a counterpart foreign application of U.S. Appl. No. 13/635,219.
European Office Action mailed Dec. 22, 2016 for European patent application No. 12880149.5, a counterpart foreign application of U.S. Appl. No. 13/635,219, 11 pages.
Japanese Office Action mailed Oct. 31, 2016 for Japanese Patent Application No. 2015-528828, a counterpart foreign application of U.S. Appl. No. 13/701,008.
Office action for U.S. Appl. No. 13/635,219, mailed on Nov. 14, 2016, Scott et al., "Cross-Lingual Input Method Editor", 27 pages.
Office action for U.S. Appl. No. 13/701,008, mailed on Nov. 30, 2016, Wang et al., "Feature-Based Candidate Selection", 21 pages.
Chinese Office Action dated Mar. 24, 2017 for Chinese Patent Application No. 201280074281.4, a counterpart foreign application of U.S. Appl. No. 13/586,267, 28 pgs.
Chinese Office Action dated Jun. 19, 2017 for Chinese Patent Application No. 201280075557.0, a counterpart foreign application of U.S. Appl. No. 13/701,008.

* cited by examiner

FEATURE-BASED CANDIDATE SELECTION

RELATED APPLICATION

This application is a national stage application of an international patent application PCT/CN2012/080749, filed Aug. 30, 2012, which application is hereby incorporated by reference in its entirety.

TECHNICAL FIELD

This disclosure relates generally to an input method editor (IME), and more particularly, to an IME with multiple operating modes.

BACKGROUND

An input method editor (IME) is a computer functionality that assists a user to input text into a host application of a computing device. An IME may provide several suggested words and phrases based on received inputs from the user as candidates for insertion into the host application. For example, the user may input one or more initial characters of a word or phrase and an IME, based on the initial characters, may provide one or more suggested words or phrases for the user to select a desired one.

For another example, an IME may also assist the user to input non-Latin characters such as Chinese. The user inputs Latin characters through a keyboard and the IME returns one or more Chinese characters as candidates for insertion into the host application based on the Latin characters. The user may then select the proper character and insert it into the host application. As many typical keyboards support inputting Latin characters, the IME is useful for the user to input non-Latin characters using a Latin-character keyboard.

The candidates selected by the user can be inserted into various host applications, such as a chatting application, a document editing application, an email application, a drawing application, a gaming application, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The term "techniques," for instance, may refer to device(s), system(s), method(s) and/or computer-readable instructions as permitted by the context above and throughout the present disclosure.

This disclosure describes techniques to provide alternate candidates for selection and/or insertion by a user through an input method editor (IME). In various embodiments, an IME is executable by a computing device. The IME may present candidates to a user for insertion into a host application. The IME may present different types of candidates depending on the input by the user and context of the input. The IME may provide both text candidates and alternate candidates in a form that is different from the form of the input.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes techniques to relate an input method editor (IME) that presents candidates to a user that may be selected by the user for insertion into a host application. The candidates presented to the user may be based at least in part on a user-selectable mode of the IME. The candidates may include text candidates such as non-Latin or Chinese characters, and rich candidates such as multimedia candidates, in order to provide supplemental information to a user and to enhance the user experience. Additionally or alternatively, the candidates may be based at least in part on the context of user input, which may include, but is not limited to, the host application, previous user input, adjacent user input, a combination thereof, and other contextual information. Additionally or alternatively, the candidates may, upon user selection, replace or augment the entered text.

In various embodiments, the user inputs are one or more of textual characters or symbols input by the user into a composition window of an IME. The user input may represent one or more expressions, search queries, parts thereof, or combinations thereof. For example, a user input may be a series of initial characters, an abbreviation, a spelling, and/or a translation of one or more words or phrases. The user inputs and the expressions represented by the user inputs, such as words or phrases, may be in the same or different languages. The user may input the user inputs through a variety of input methods, such as a keyboard input, a voice input, a touch screen input, a gesture, a movement, or a combination thereof.

In various embodiments, candidates are provided in alternate forms from a user input. For example, if the user inputs text, then alternate candidates may be provided in the form of image(s), video(s), audio file(s), web link(s), web page(s), map(s), other multimedia file(s), or a combination thereof.

In various embodiments, candidates are ranked according to the relevancies to the user inputs and/or the context of the user input.

Illustrative System Model

Figure 1:
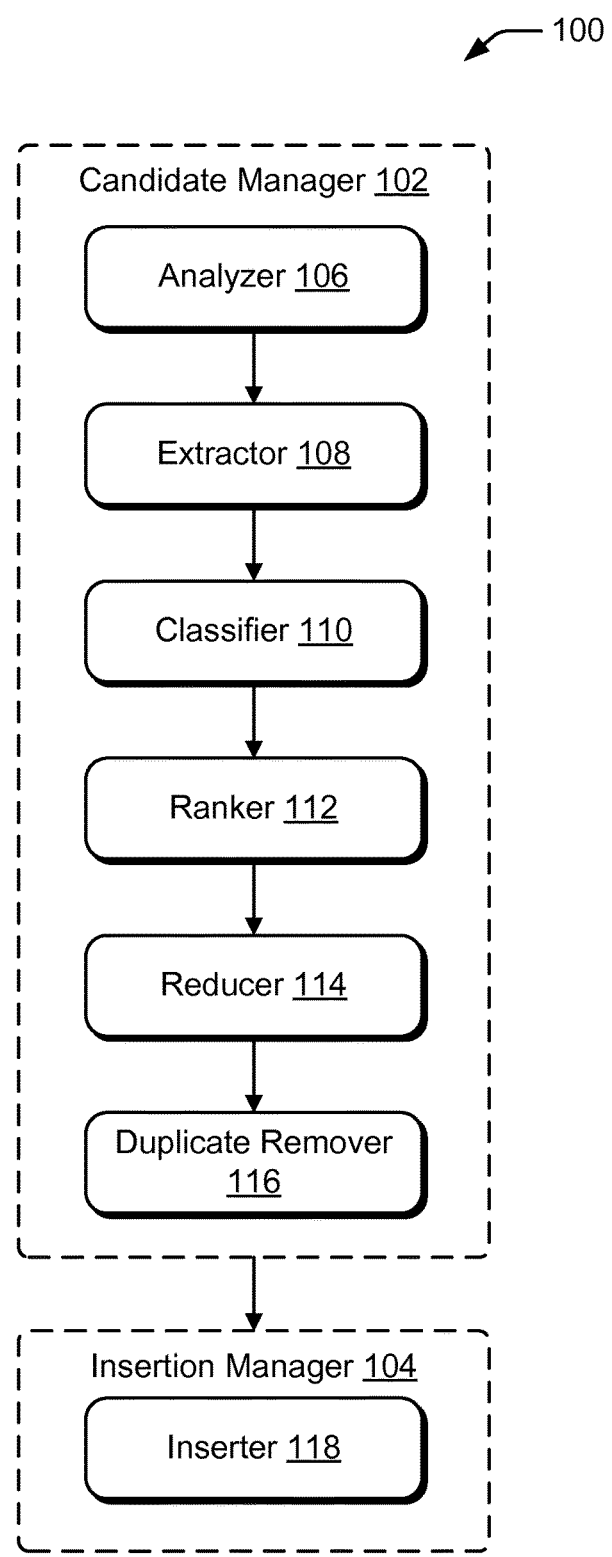
FIG. 1 is a block diagram of an example configuration of an IME according to at least one embodiment.

FIG. 1 shows an exemplary system model of an IME. For example, IME 100 may comprise a candidate manager 102 and an insertion manager 104. The candidate manager 102 comprises an analyzer 106 that analyzes a user input, a context of the user input, or a combination thereof. For example, the analyzer 106 may analyze the user input in the form of text to infer what the input represents. The analyzer 106 may also determine the context of the user input. For example, a context of the user input includes, but is not limited to, the host program that the IME is supporting, past and/or separate input made by the user in the same IME session, input made by a participant in the host program adjacent to the current input, location of the user, other factors, or a combination thereof.

In various embodiments, if personal information such as location information, conversation or search contents is stored or transmitted, then the user may have an opportunity to decide to allow the collection, storage, and/or transmittal, and/or an opportunity to discontinue the same. In various embodiments, if personal information is stored or transmitted, adequate security measures and features are in place to secure the personal data. Additionally or alternatively, context may comprise triggering words or phrases. For example, a user may input the phrase "photo of" directly before an input indicating that alternative candidates are sought. In this example, the phrase "photo of" may provide context that a user is interested in seeing an image or photo of the input that follows. Other illustrative triggering words or phrases may include, but are not limited to, "image", "video", "sound", "hear", "nearby", "picture", "let me see", "have a look at", "did you see", and the like. It is understood that triggering words or phrases may be specific to a culture and/or a language.

In various embodiments, both the content and context of the user input are used to inform selection of the candidates. In a possible embodiment, the context and content of the user input is used to formulate a search to gather candidates. In one example, a user inputs the text "forbidden city" into a chat program while several lines or entries prior to entering "forbidden city," the user or a third party previously input the term "moat." In this example, the content of the input may be "forbidden city" and the context of the input may be a chat program and the textual input "moat."

In this example, the candidate manager 102 may cause a search of images, videos, audio files, graphics, others, or a combination thereof to find a "moat" at, near, belonging to, or in the "forbidden city." This example may differ from a search that does not take into account the context of the user input.

In various embodiments, the search caused by the candidate manager 102 may be facilitated by a search engine, for example, a commercial search engine on a search engine computing device capable of searching various forms of media. For example, the search engine computing device may select a search engine, such as Bing®, Google®, Yahoo®, Alibaba®, or the like, to gather candidates. The candidates may include, for example, web search results, video search results, image search results, audio file search results or dictionary and encyclopedia search results.

In various embodiments, the search caused by the candidate manager 102 may be based at least in part on content of a user input and/or context of the user input.

In various embodiments, the search caused by the candidate manager 102 may return candidates with any surrounding text, metadata associated with the candidate, or a combination thereof.

In various embodiments, the search caused by the candidate manager 102 may return candidates with results information in a ranked format. For example, the results information may include the ranked format and may provide a set of top results, a set of tail or lowest results, and/or duplicate candidates.

In various embodiments, the candidate manager 102 selects one or more references from the candidates. For example, several reference images may be selected from a set of all candidate images returned by the search engine. The reference images may be selected based at least in part on the rank and number of duplicate or similar images returned. For example, the top N candidate images returned from the search, where N is an integer greater than or equal to zero, may be considered as possible reference images. Additionally or alternatively, the bottom M candidate images or tail candidate images returned from the search, where M is an integer greater than or equal to zero, may be considered as possible images to avoid as reference images. Additionally or alternatively, the number of duplicate or similar images may be considered as possible reference images. For example, if a first candidate image has more duplicates or similar images than a second candidate image, then the first candidate image may be considered a better reference image than the second candidate image. Additionally or alternatively, the number of duplicate or similar images may be indicative of the popularity, trendiness, or similar aspect of the candidate image.

Additionally or alternatively, the candidate manager 102 may include an extractor 108. In various embodiments, the extractor 108 may extract features of the references. For example, the extractor 108 may extract features from candidate images selected to be reference images. In various embodiments, the features extracted from the reference images may comprise average features.

Additionally or alternatively, the extractor 108 may extract features from the candidate images that were not selected as reference images. In various embodiments, the extracted features from the candidate images are compared to the extracted features from the reference images. For example, a cosine distance between the features extracted from the candidate image and the features extracted from the reference image may be calculated. Additionally or alternatively, information contained in the metadata or surrounding text of the candidate image may be compared to the information contained in the metadata or surrounding text of the reference image. For example, a cosine difference is calculated between the two.

In various embodiments, each extracted feature and comparison to a reference may comprise a dimension of the candidate. Each dimension of the candidate may be used to determine its score, rank, suitability for presentation to a user, or a combination thereof. In various embodiments, the number of dimensions assembled may be large. Additionally or alternatively, a value or weight of a first dimension in comparison with a second dimension need not be evaluated or determined in this module or at the analogous stage in a related process or method.

Additionally or alternatively, the candidate manager 102 may include a classifier 110. In various embodiments, the classifier 110 may classify each candidate. For example, the classifier 110 may use the dimensions associated with a candidate image to assign a score to the candidate image. In various embodiments, the classifier may be manually programmed, seeded with initial correlations between a feature and a score where the model is expanded with subsequent searches or additions, generated by a logic engine, or a combination thereof. Additionally or alternatively, the classifier may be developed, updated, maintained offline, online, or a combination thereof. Additionally or alternatively, a regression model may be used to map a relative feature of an image reflected in a dimension to a score. In various embodiments, the score may be aggregated for each candidate image to generate a candidate score.

Additionally or alternatively, the candidate manager 102 may include a ranker 112. In various embodiments, the ranker 112 may rank each candidate. For example, the ranker 112 may rank each candidate image based at least in part on a candidate score.

Additionally or alternatively, the candidate manager 102 may include a selection process where candidates are one or more of selected, made available for selection, made unavailable for selection, removed from consideration, or a combination there of. For example, candidate manager 102 may include a reducer 114. In various embodiments, the reducer 114 may reduce the number of candidates considered. For example, the reducer 114 may remove from consideration each candidate image based at least in part on a candidate score. In various embodiments, a candidate with a candidate score below a threshold will be removed from consideration.

Additionally or alternatively, the candidate manager 102 may include a duplicate remover 116. In various embodiments, the duplicate remover 116 may be included as part of the selection process. In various embodiments, the duplicate remover 116 may reduce the number of candidates considered. For example, the duplicate remover 116 may remove duplicate images from the candidate images. Additionally or alternatively, the duplicate remover 116 may remove exact duplicates as well as candidate images that are similar to each other. For example, if the difference between a first and a second candidate image is below a threshold difference or within a similarity threshold, then the first and second candidate images may be considered sufficiently similar or duplicative of each other. In this example, the duplicate remover 116 may remove either the first or the second candidate image from consideration and/or make the candidate unavailable for selection.

For example, as discussed above, in various embodiments, the content of the user input and the context of the user input is used to inform and determine the candidates to be presented. In various embodiments, the context and content of the user input is used to formulate a search to gather candidates, extract features, classifier candidates, and/or rank candidates. For example, a user inputs the text "forbidden city" into a chat program. However, several lines or entries prior to entering the text "forbidden city," the user and a third party input the term "moat." In this example, the content of the input may be "forbidden city" and the context of the input may be a chat program and the textual input "moat."

In this example, the candidate manager 102 may cause a search of images, videos, audio files, graphics, others, or a combination thereof to find a "moat" at, near, belonging to, or in the "forbidden city." This example may differ from a search that does not take into account the context of the user input, but merely searches for the "forbidden city." In this example, the search for "forbidden city" may or may not return an image of the Forbidden City containing its moat. Additionally or alternatively, the extractor 108 may extract features and create dimensions related to the term "moat." Additionally or alternatively, the classifier 110 may map a higher score to an image containing a dimension related to a moat feature than to an image without a dimension related to a moat feature. Additionally or alternatively, the ranker 112 may rank a candidate image containing a moat higher than a candidate image without a moat. In this example, by taking into account the context of the input related to "forbidden city," the previously used term "moat," may result in a more desirable set of candidate images when, for example, the user desires an image of the moat at the Forbidden City and not an image of the Forbidden City itself.

Additionally or alternatively, IME 100 may comprise the insertion manager 104. In various embodiments, the insertion manager 104 includes an inserter 118 that may provide candidates to a user for insertion. For example, the inserter 118 may cause a subset of the candidate images to be displayed to a user based at least in part on the user input, the context of the user input, the remaining candidates, or a combination thereof. For example, if the user is inputting text into a chat program, the inserter 118 may identify the chat program as the host program for the IME and display an appropriate number of candidate images at one time. Additionally or alternatively, the inserter 118 may show all of the available candidate images at the same time.

Figure 2:
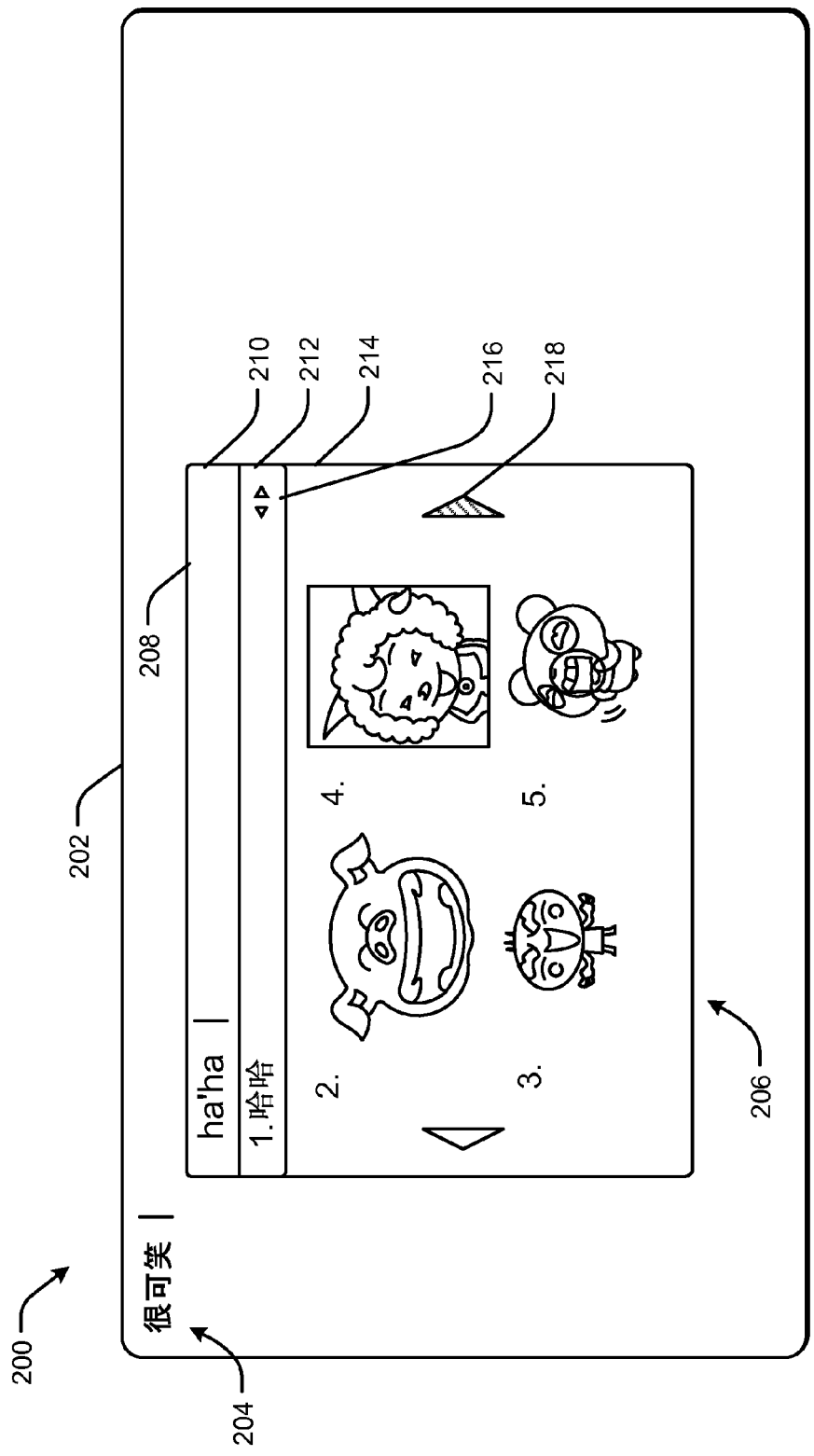
FIG. 2 is a pictorial view of an example of a host application utilizing an IME according to at least one embodiment.

FIG. 2 shows a pictorial view of an example of a host application utilizing an IME according to at least one embodiment. For example, FIG. 2 shows an example 200 of host application 202 utilizing an IME according to various embodiments. Host application 202 is shown here as a chat application. Host application 202 may also be document-editing application, a drawing application, an email application, or various other applications.

In the illustrated example, host application 202 includes a text insertion area, generally indicated by 204. Text insertion area 204 includes characters inserted directly into the host application by the user or via IME 206. Text insertion area 204 also includes an input indication represented by "|," which represents an indication of where the candidates are to be inserted into host application 202 by, for example, insertion manager 104. The input indication may be, for example, a focus of a mouse. The input indication also indicates which host application 202 of a computing device among many host applications running on the computing device that is to receive the candidates inserted by IME 206. In one particular example, multiple host applications may utilize the features of IME 206 simultaneously and the user may switch between one or more of the host applications to receive the candidates by moving the input indication between the host applications.

In the illustrated example, IME 206 is operating to insert Chinese characters into host application 202 using pinyin.

IME 206 is shown as user interface 208, which includes composition window 210 for receiving user inputs, text candidate window 212 for presenting text candidates to the user, and alternate candidate window 214 for presenting alternate forms of candidates to the user. Text candidate window 212 is shown including previous and next candidate arrows 216, which the user can interact with to receive additional text candidates not currently shown in text candidate window 212. Alternate candidate window 214 is also shown including a previous and next candidate arrows 218, which the user can interactive with to receive additional alternate candidates not currently shown in alternate candidate window 214.

While various alternate candidate modes are illustrated, other alternate candidate modes may be used without departing from the scope of the present disclosure. For example, IME 206 may include an audio mode where, for example, an alternate candidate may include audio files, such as Moving Picture Experts Group (MPEG) MPEG-1 or MPEG-2 Audio Layer III (mp3) files. Additionally or alternatively, IME 206 may include a video mode where, for example, an alternate candidate may include videos. Additionally or alternatively, IME 206 may include graphical text where, for example, an alternate candidate may include graphical text. An example of a graphical text may include but is not limited to a graphics file (e.g., an image file) containing text. Additionally or alternatively, IME 206 may include animated graphical images where, for example, an alternate candidate may include an animated graphical image. By interacting with the previous and next candidate arrows 216, the user may gain access to these additional rich candidate modes at the rich candidate mode menu. Additionally or alternatively, the IME 206 may take context of the user input into account and display one type before another type, or a combination of two or all possible types.

In the illustrated example, the user has entered the text "ha'ha." As a result of the user entering text in this context, IME 206 is in alternate candidate mode. While in alternate candidate mode, text candidate window 212 continues to translate the text "ha'ha" from pinyin into Chinese characters. On the other hand, alternate candidate window 214 presents image search results for the text "ha'ha" to the user. As illustrated, alternate candidate window 214 presents options 2-5 including images of various cartoon animals laughing.

In various embodiments, the user may cause IME 206 to insert either the Chinese characters indicated in text candidate window 212 into host application 202 at text insertion area 204 by entering "1", or an image as shown in alternate candidate window 214 by entering "2", "3", "4", or "5". Other user selection options may be used without departing from the scope of the present disclosure.

Illustrative Computing Device and Illustrative Operational Environment

Figure 3:
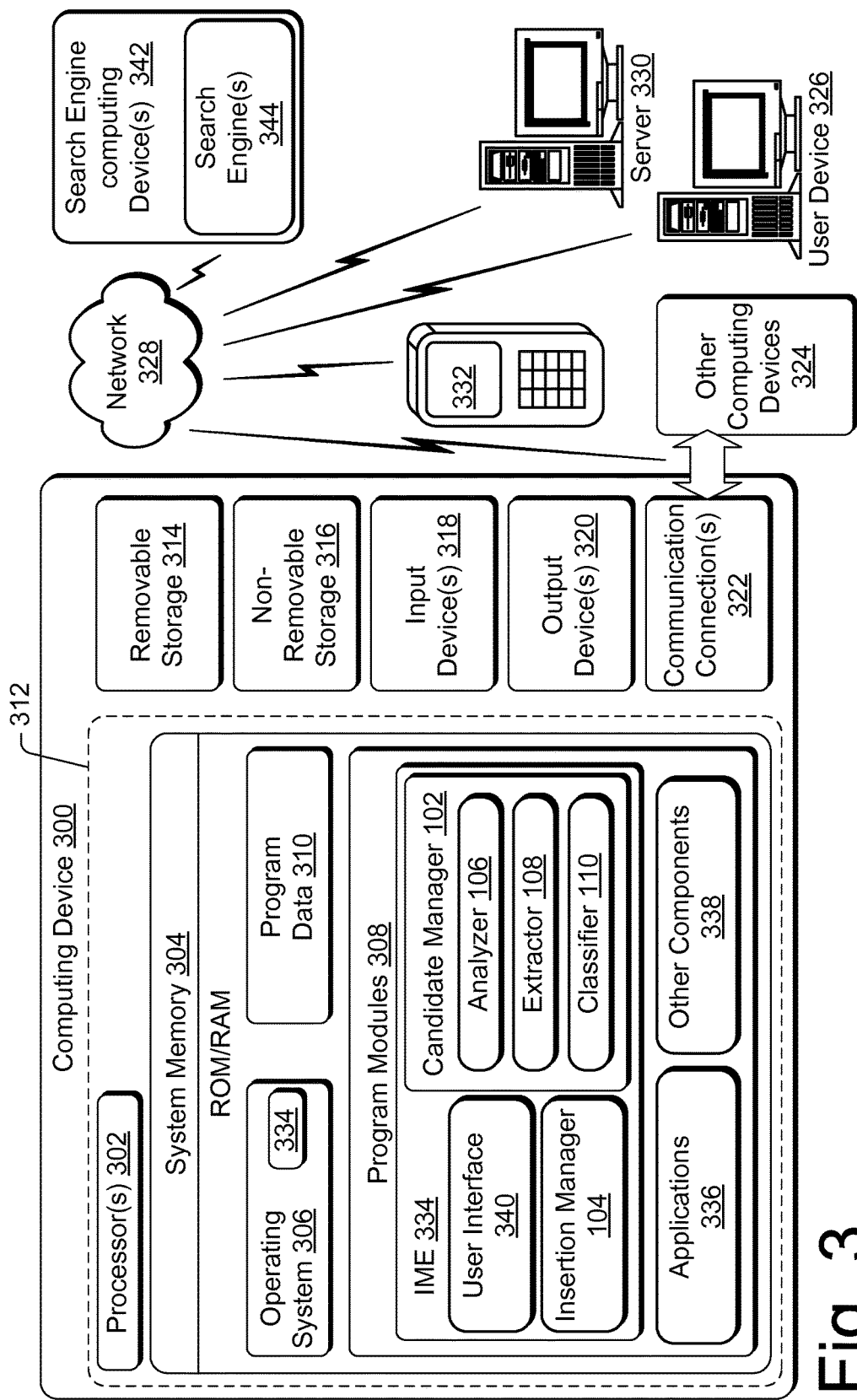
FIG. 3 shows an illustrative representative computing device and environment for implementing an IME.

FIG. 3 illustrates a representative computing device 300 that may, but need not necessarily be used to, implement the system and methods described herein, in accordance with various embodiments. The techniques and mechanisms described herein may be implemented by multiple instances of the computing device 300, as well as by any other computing device, system, and/or environment. The computing device 300 shown in FIG. 3 is only one example of a computing device and is not intended to suggest any limitation as to the scope of use or functionality of any computing device utilized to perform the processes and/or procedures described above.

In at least one configuration, the computing device 300 includes at least one processor 302 and system memory 304. The processor(s) 302 may execute one or more modules and/or processes to cause the computing device 300 to perform a variety of functions. In some embodiments, the processor(s) 302 may include a central processing unit (CPU), a graphics processing unit (GPU), both CPU and GPU, or other processing units or components known in the art. Additionally, each of the processor(s) 302 may possess its own local memory, which also may store program modules, program data, and/or one or more operating systems.

Depending on the exact configuration and type of the computing device 300, the system memory 304 may be volatile (such as RAM), non-volatile (such as ROM, flash memory, miniature hard drive, memory card, or the like) or some combination thereof. The system memory 304 may include an operating system 306, one or more program modules 308, and may include program data 310. The operating system 306 includes a component-based framework 334 that supports components (including properties and events), objects, inheritance, polymorphism, reflection, and provides an object-oriented component-based application programming interface (API). The computing device 300 is of a very basic illustrative configuration demarcated by a dashed line 312. Again, a terminal may have fewer components but may interact with a computing device that may have such a basic configuration.

Program modules 308 may include, but are not limited to, an IME 334, applications 336, and/or other components 338. In various embodiments, the IME 334 may comprise a user interface (UI) 340, candidate manager 102, and/or insertion manager 104. In various embodiments, candidate manager 102 comprises an analyzer 106, an extractor 108, and/or a classifier 110.

The computing device 300 may have additional features and/or functionality. For example, the computing device 300 may also include additional data storage devices (removable and/or non-removable) such as, for example, magnetic disks, optical disks, or tape. Such additional storage is illustrated in FIG. 3 by removable storage 314 and non-removable storage 316.

The storage devices and any associated computer-readable media may provide storage of computer readable instructions, data structures, program modules, and other data. Computer-readable media includes, at least, two types of computer-readable media, namely computer storage media and communication media.

Computer storage media includes volatile and non-volatile, removable and non-removable media implemented in any method or technology for storage of information such as computer readable instructions, data structures, program modules, or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Moreover, the computer-readable media may include computer-executable instructions that, when executed by the processor(s) 302, perform various functions and/or operations described herein.

The computing device 300 may also have input device(s) 318 such as a keyboard, a mouse, a pen, a voice input device, a touch input device, etc. Output device(s) 320, such as a display, speakers, a printer, etc. may also be included.

The computing device 300 may also contain communication connections 322 that allow the device to communicate with other computing devices 324, such as over a network. By way of example, and not limitation, communication media and communication connections include wired media such as a wired network or direct-wired connections, and wireless media such as acoustic, radio frequency (RF), infrared, and other wireless media. The communication connections 322 are some examples of communication media. Communication media may typically be embodied by computer readable instructions, data structures, program modules, etc.

FIG. 3 also shows a schematic diagram of an illustrative operating environment where an illustrative system may operate. For example, various embodiments of the system may operate on the computing device 300. The computing device 300 may interact with a user device 326 directly or indirectly. The computing device may be connected to a network 328. The network device 328 may provide access to other computing devices 324 including a server 330, mobile devices 332, and/or other connections and/or resources. Connections may be wired or wireless.

The illustrated computing device 300 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

Additionally or alternatively, the computing device 300 implementing IME 334 may be in communication with one or more search engine computing devices 342 via, for example, network 328.

Communication connection(s) 322 are accessible by processor(s) 302 to communicate data to and from the one or more search engine computing devices 342 over a network, such as network 328. Search engine computing devices 342 may be configured to perform the search using one or more search engines 344. Search engines 344 may be a generic search engine such as Bing®, Google®, or Yahoo®, a combination of search engines, or a custom search engine configured to operate in conjunction with IME 334 (such as a translation engine). Search engines 344 may also be a specialized form of a search engine such as Bing®, Maps, or Google® image search.

It should be understood that IME 334 may be used in an environment or in a configuration of universal or specialized computer systems. Examples include a personal computer, a server computer, a handheld device or a portable device, a tablet device, a multi-processor system, a microprocessor-based system, a set-up box, a programmable customer electronic device, a network PC, and a distributed computing environment including any system or device above.

Illustrative Processes

For ease of understanding, the processes discussed in this disclosure are delineated as separate operations represented as independent blocks. However, these separately delineated operations should not be construed as necessarily order dependent in their performance. The order in which the processes are described is not intended to be construed as a limitation, and any number of the described process blocks may be combined in any order to implement the process, or an alternate process. Moreover, it is also possible that one or more of the provided operations may be modified or omitted.

The processes are illustrated as a collection of blocks in logical flowcharts, which represent a sequence of operations that may be implemented in hardware, software, or a combination of hardware and software. For discussion purposes, the processes are described with reference to the system shown in FIGS. 1-3. However, the processes may be performed using different architectures and devices.

Figure 4:
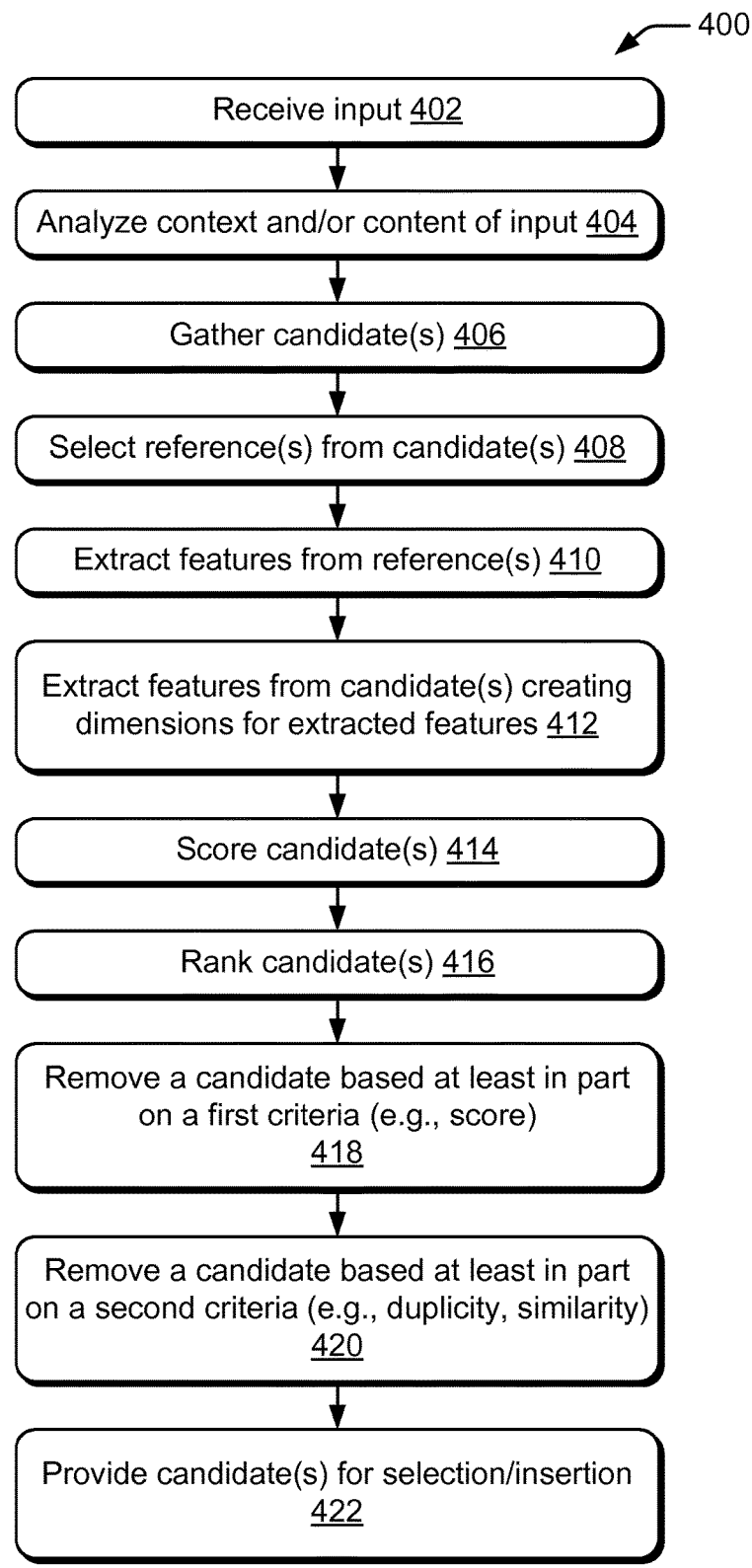
FIG. 4 is a flow diagram of an example process preformed by an IME according to at least one embodiment.

FIG. 4 is a flowchart of an illustrative process 400 of providing one or more candidates based at least in part on an input. At 402, an input is received by an IME. This input may be from a user and may comprise text, graphics, gesture, voice, sound, motion, or a combination thereof and may be received from a keyboard, a microphone or voice input mechanism, a mouse, a touch screen and/or a combination thereof. Additionally or alternatively, the input may be received with context of the input. Context may comprise a host application that an IME is supporting. Additionally or alternatively, context may comprise words or phrases inputted by the user separate from the input, adjacent to the input, or a combination thereof.

At 404, the IME may analyze the content of the input as well as the context of the input. The content and the context may, together or separately, be used by the IME to determine whether alternate candidates should be provided. For example, if an input is directly adjacent to a trigger phrase, that context may increase the likelihood that a user is interested in an alternate candidate and alternate candidates may be provided.

At 406, the IME may gather one or more candidates. For example, the received input may be formulated into a query and sent to a search engine. Additionally or alternatively, aspects of the context may influence the query, by for example, adding additional or excluding relevant query terms. In various embodiments, the query will return results in the form of ranked results. The ranked results may include a number of top ranked results, a number of bottom or tail ranked results, and various duplicate and/or similar results. Additionally or alternatively, the results may also include any metadata associate with each candidate. Additionally or alternatively, the results may also include surrounding text of the candidate.

At 408, the IME may select one or more references from the candidates. The IME may select a reference based at least in part on the rank of a candidate returned from the query and the number of duplicate or similar candidates.

At 410, the IME may extract features from the references. The features extracted from the references may be reference features. In various embodiments, the reference features may be considered average features for the given set of candidates in light of the content and context of the input.

At 412, the IME may extract features from the candidate images. The features extracted from the candidate images may be considered candidate features. In various embodiments, the extracted candidate features are compared to the analogous extracted reference features. A difference between the analogous extracted features may be used to define a dimension associated with the candidate. In various embodiments, extracted features may include features contained in the reference itself, for example, if the reference is an image, the image may contain an image of water where the water feature may be extracted. Additionally or alternatively, the extracted features may include features contained in information associated with the candidate. For example, the image may contain metadata that may be examined and/or extracted. Additionally or alternatively, the image may have been surrounded by text that was returned as part of the query results. The surrounding text may be examined and/or extracted.

At 414, the IME may score each candidate. In various embodiments, a classifier scores each candidate based at least in part on the dimensions and extracted features. In various embodiments, the classifier may be an offline learned or trained model. Additionally or alternatively, the classifier may be manually seeded with initial settings and examples and trained by searching around the seeded material to expand the model coverage and/or increase the models accuracy. In various embodiments, emotive words are the target for replacement by or supplementation with an alternate form. Additionally or alternatively, popular terms, phrases, topics, or a combination thereof, may be mapped using the seed and search method. The IME may use the classifier to map an extracted feature to a score. The score for each feature and/or dimension may be aggregated for each candidate to create a candidate score.

At 416, the IME may rank the candidates based at least in part on the candidate scores.

At 418, the IME may remove candidates based at least in part on a first criteria. In various embodiments, the first criteria comprises whether the candidate score is greater than a threshold score. When a candidate score is lower than the threshold score, the candidate s removed from consideration.

At 420, the IME may remove candidates based at least in part on a second criteria. In various embodiments, the second criteria comprises whether the candidate is duplicative or similar to another candidate. When the candidate is duplicative of another candidate, the IME may remove either the candidate or the another candidate from consideration. Similarly, when the dissimilarity between a candidate and another candidate fails to exceed a threshold of distinction, the IME may remove either the candidate or the another candidate from consideration. In various embodiments, a comparison between a candidate and another candidate may be based at least in part on local features, global features, a pixel-level comparison, or a combination thereof.

At 422, the IME may provide one or more candidates for selection or insertion by a user into an application.

CONCLUSION

The subject matter described above can be implemented in hardware, software, or in both hardware and software. Although implementations have been described in language specific to structural features and/or methodological acts, it is to be understood that the subject matter defined in the appended claims is not necessarily limited to the specific features or acts described above. Rather, the specific features and acts are disclosed as example forms of implementing the claims. For example, the methodological acts need not be performed in the order or combinations described herein, and may be performed in any combination of one or more acts.

What is claimed is:

1. A system comprising:
one or more processors; and
memory storing modules that, when executed by the one or more processors, cause the one or more processors to:
receive search criteria including at least a current user input in a user interface, the user interface associated with an input method editor (IME) interface associated with a host application, the host application selected from a plurality of host applications based at least in part on an indication from a user;
receive one or more candidates returned by a search engine based at least in part on the search criteria, the search criteria including a content of the current user input and a context of the current user input, the context of the current user input including at least a relevance of the current user input to a preceding user input in a same session of the host application, the preceding user input received at the host application prior to the current user input, the relevance of the current user input to the preceding user input based at least in part on a spatial relationship between the current user input and the preceding user input in the host application;
select one or more references from the one or more candidates returned by the search engine;
assign corresponding scores to the one or more candidates based at least in part on a comparison between one or more candidate features extracted from the one or more candidates and one or more reference features extracted from the one or more references, the corresponding scores further based in part on the context of the current user input;
rank the one or more candidates based at least in part on the corresponding scores;
remove a first candidate from the one or more candidates when a score of the corresponding scores of the first candidate is below a threshold score;
select one or more selected candidates from the one or more candidates based at least in part on the corresponding scores;
provide, in the user interface, the one or more selected candidates for user selection;
receive the user selection of a user selected candidate from the one or more selected candidates; and
provide to the host application the user selected candidate.

2. The system of claim 1, wherein the current user input comprises one or more of a textual input, a gesture, a motion, or a voice input.

3. The system of claim 1, wherein the one or more candidates returned by the search engine are returned in a ranked order.

4. The system of claim 3, wherein the one or more candidates returned by the search engine are further based in part on results information, the results information based at least in part on one or more of a set of top ranked results, a set of tail ranked results, or a set duplicate results.

5. The system of claim 1, wherein the one or more candidates comprise one or more of a candidate image, a candidate video, a candidate audio file, or a textualized graphic.

6. The system of claim 1, wherein the one or more reference features comprise average features of the one or more references.

7. The system of claim 1, wherein at least one of the corresponding scores is assigned based at least in part on a classifier, and wherein the classifier assigns the at least one of the corresponding scores based at least in part on a learned model that maps features to a score value.

8. The system of claim 1, wherein at least one of the corresponding scores is assigned based at least in part on a classifier, wherein the classifier assigns the at least one of the corresponding scores based at least in part on a regression model.

9. The system of claim 1, wherein an individual candidate of the one or more candidates with a corresponding score greater than the threshold score value is available for selection.

10. The system of claim 1, wherein the select the one or more selected candidates from the one or more candidates based at least in part on the corresponding scores comprises a comparison between a candidate and another candidate, wherein a candidate duplicative or within a similarity threshold of another candidate is made unavailable for selection.

11. The system of claim 10, wherein the comparison between the candidate and the another candidate is based at least in part on one or more of local features, global features, or pixel-level comparisons.

12. The system of claim 1, the memory storing modules that further cause the one or more processors to:
   determine that a first score of the corresponding scores associated with a first candidate of the one or more selected candidates is within a similarity threshold of a second score of the corresponding scores associated with a second candidate of the one or more selected candidates; and
   remove the second candidate from the one or more selected candidates.

13. A system comprising:
   one or more processors;
   an input method editor (IME) interface, the IME interface including a user interface, the user interface to receive a textual input and to provide an output to a host application, the host application selected from a plurality of host applications based at least in part on an indication from a user;
   an analyzer executable by the one or more processors to analyze a content of the textual input and a context of the textual input, the context of the textual input including at least a relevancy of the textual input to a preceding textual input in a user conversation, the relevancy of the textual input to the preceding textual input based at least in part on a spatial relationship between the textual input and the preceding textual input in the user conversation;
   a candidate manager executable by the one or more processors to gather one or more candidate images based at least in part on the content of the textual input and the context of the textual input, and to select one or more reference images from the one or more candidate images based at least in part on search results returned from a search engine;
   an extractor executable by the one or more processors to extract one or more reference features from the one or more reference images and to extract one or more candidate features from the one or more candidate images;
   a classifier executable by the one or more processors to:
      assign one or more scores to the one or more candidate images based at least in part on a comparison between the one or more candidate features and the one or more reference features; and
      rank the one or more candidate images based at least in part on the one or more scores;
   a reducer executable by the one or more processors to remove a first candidate image from the one or more candidate images based at least in part on a score of a candidate compared to a threshold score value; and
   an insertion manager executable by the one or more processors to provide the one or more candidate images for selection in the user interface.

14. The system of claim 13, further comprising a duplicate remover executable by the one or more processors to remove a second candidate image from the one or more candidates based at least in part on one or more of a duplicity of a candidate to another candidate or a similarity of a candidate to another candidate.

15. The system of claim 13, wherein a reference image of the one or more reference images is selected based in part on a number of duplicate images or similar images associated with the reference image.

16. A method comprising:
   receiving a current textual input from a user through an input method editor (IME) interface, the IME interface including a user interface and providing output for a selected host application of a plurality of host applications, the selected host application selected based at least in part on an indication from the user;
   analyzing, by a computing device, a content of the current textual input and a context of the current textual input, the context of the current textual input based at least in part on a type of the selected host application;
   gathering one or more candidate images from a search engine based at least in part on the context of the current textual input and the content of the current textual input, the context of the current textual input including at least a relevancy of the current textual input to a preceding textual input in a user conversation, the preceding textual input received prior to the current textual input, the relevancy of the current textual input to the preceding textual input based at least in part on a spatial relationship between the current textual input and the preceding textual input in the user conversation;
   selecting one or more reference images from the one or more candidate images based at least in part on results from the search engine;
   extracting one or more reference features from the one or more reference images;
   extracting one or more candidate features from the one or more candidate images; assigning a score to the one or more candidate images based at least in part on the one or more candidate features;
   ranking the one or more candidate images based at least in part on the score;
   removing a first candidate image from the one or more candidate images when the score of the first candidate image is below a threshold score;
   removing a second candidate image from the one or more candidate images based at least in part on a comparison of features between the second candidate and another candidate;
   providing a ranked subset of remaining candidate images of the one or more candidate images, to the user, for selection through the IME interface; and
   in response to receiving a selection of an image of the ranked subset of remaining candidate images, providing the image to the selected host application.

17. The method of claim 16, wherein the results from the search engine comprise one or more of a set of top ranked results, a set of tail ranked results, or a set duplicate results.

18. The method of claim 16, wherein the comparison of features between the second candidate and the another candidate is based at least in part on one or more of local features, global features, or a pixel-level comparison.

19. The method of claim 16, further comprising inserting the image into the user conversation associated with the host application, the image replacing at least a portion of text included in the user conversation.

* * * * *